United States Patent [19]

Schoettle et al.

[11] Patent Number: 5,418,671
[45] Date of Patent: May 23, 1995

[54] MAGNETIC TAPE CASSETTE WITH AN IMPROVED SUPPORT LINER ARRANGEMENT

[75] Inventors: Klaus Schoettle, Strasbourg, France; Klaus Manzke, Westheim, Germany; Kurt Schmidts, Schwanau, Germany; Arno Huck, Rheinau, Germany; Joachim Eberhard, Kippenheim, Germany

[73] Assignee: BASF Aktiengesellschaft, Ludwigshafen, Germany

[21] Appl. No.: 781,123

[22] PCT Filed: Aug. 10, 1990

[86] PCT No.: PCT/EP90/01317
§ 371 Date: Jan. 6, 1992
§ 102(e) Date: Jan. 6, 1992

[87] PCT Pub. No.: WO91/03052
PCT Pub. Date: Mar. 7, 1991

[30] Foreign Application Priority Data

Aug. 12, 1989 [DE] Germany ............ 89 09 706 U

[51] Int. Cl.⁶ .............. G11B 15/32; G11B 23/04; G03B 1/04
[52] U.S. Cl. .................... 360/132; 242/345
[58] Field of Search ............ 360/132; 242/199

[56] References Cited

U.S. PATENT DOCUMENTS

| | | | |
|---|---|---|---|
| 3,923,272 | 12/1975 | Pertzsch et al. | 242/199 |
| 4,101,096 | 7/1978 | Oishi et al. | 242/199 |
| 4,102,515 | 7/1978 | Milants | 242/199 |
| 4,127,242 | 11/1978 | Hashimoto et al. | 242/199 |
| 4,191,984 | 3/1980 | Tsukidate et al. | 360/132 |
| 4,289,285 | 9/1981 | Ishida et al. | 242/199 |
| 4,452,408 | 6/1984 | Sasaki | 360/132 |
| 4,541,588 | 9/1985 | Sato | 242/199 |
| 4,563,718 | 1/1986 | Shirako | 360/132 |
| 4,681,280 | 7/1987 | Duurland et al. | 242/199 |

FOREIGN PATENT DOCUMENTS 2246017 4/1975 France .
2211818 7/1989 United Kingdom .......... 242/199

Primary Examiner—Stuart S. Levy
Assistant Examiner—Jefferson Evans
Attorney, Agent, or Firm—Keil & Weinkauf

[57] ABSTRACT

A tape cassette is provided with a housing bearing constriction for the hubs and the support liners are provided with curved or bent liner regions which serve both for guiding the empty hub and for aligning and guiding the windings on the hub, in particular the first tape windings to be wound. Practical embodiments of the liner regions differ from one another in that they have different cross-sectional shapes and different arrangements in the longitudinal direction, tranverse direction or both or have a circular shape.

15 Claims, 5 Drawing Sheets

MAGNETIC TAPE CASSETTE WITH AN IMPROVED SUPPORT LINER ARRANGEMENT

BACKGROUND OF THE INVENTION

1. Field of the Invention

A tape cassette, in particular a magnetic tape cassette, having one or more tape rolls on an essentially flangeless hub, onto which and/or from which a tape can be wound or unwound in a cassette housing, support liners having curved or bent liner regions which are coordinated with one another, are opposite one another with respect to the central cassette plane and can come into contact with the hubs, the tape rolls and the tape temporarily or permanently being provided between the tape roll having tape windings and the bottom and lid walls of the cassette, and an axial bearing constriction being provided between the hubs and the cassette housing, and the support liners extending at least as far as the bearing constriction, and suitable support liners for such tape cassettes.

2. Description of the Related Art

German Utility Model 8,606,119 discloses a tape cassette whose housing is provided with annular beads in the region outside the hubs. Although support liners which are likewise bent are used, even minor disturbances of the tape roll (unevenness) result in Jamming, thus preventing operation of the cassette.

With the cassette according to German Published Application DAS 2,327,828, a certain axial bearing resilience is achievable for the tape roll by virtue of the fact that inner rings projecting beyond the normal end face of the hubs are supported on resilient liner parts located above corresponding housing cavities. However, this provides virtually no guidance for the tape roll, so that tape roll and running problems are not avoided.

German Utility Model 7,221,230 furthermore describes, as bearing means for hubs in magnetic tape cassettes, support liners which are located opposite one another, have embossed circular rings and are arranged coaxially over the hubs but contribute essentially nothing to tape roll and tape guidance.

Finally, German Patent 2,825,457 combined two of the abovementioned possibilities, the use of a raised bearing edge on the hub and of longitudinal embossings in the liner which engage the annular groove in conventional hubs, in conjunction with liner regions which are supported on the housing walls outside the hub diameter. The disadvantage here is the tape clip present on conventional hubs, which leads to irregularities in the rotation of the hub, which should in fact be better guided by the bearing edge and the liner embossings.

Dimensioning the hubs and liner embossings is difficult if it is intended to avoid jamming of the tape roll in all operating states. This situation cannot be altered also because a relatively broad liner middle part which is convex with respect to the housing inner walls and is intended to provide additional resilient support for the hubs is provided between the liner embossings. Such broad liner middle part deformations are also very stable here, cannot be produced accurately and repeatably in large amounts, are caused to disappear by thermoplastic flow or shrinkage or lose their curvature through adhesion due to elastic loading on the housing walls and hence lose their effectiveness. Thus, tape rolls which are step-like and wound in other irregular ways can still form and lead to the known problems with cassette operation.

It is an object of the present invention better to hold, align and guide the hub, the tape roll and the tape and to provide tape cassettes suitable for this purpose or suitable support liners for such tape cassettes.

SUMMARY OF THE INVENTION

We have found that this object is achieved by the tape cassette described at the outset, particularly a magnetic tape cassette having one or more tape rolls on an essentially flangeless hub, onto which and/or from which a tape can be wound or unwound in a cassette housing, support liners having curved or bent liner regions which are coordinated with one another, are located opposite to one another with respect to the cassette central plane and can come into contact with the hubs, the tape rolls and the tape temporarily or permanently being provided between the tape roll having tape windings and the bottom and lid walls of the cassette, and an axial bearing constriction being provided between the hubs and the cassette housing, and the support liners extending at least as far as the bearing constriction, if the bearing constriction is formed, on the cassette housing, as annular edges located in the region of the inner diameter of the hub, and the curved or bent liner regions have run-on sections, of which first run-on sections face the particular hub and, for at least parts of its upper and lower outer annular edges, serve for guiding the empty hub and, in addition to the first run-on sections, second run-on sections are provided which realign with the hub each of the tape windings to be wound.

We have found that this object is furthermore achieved by support liners for tape cassettes, in particular magnetic tape cassettes, having one or more tape rolls carrying tape windings on an essentially flangeless hub, for resting under spring force between the tape roll and the cassette bottom and lid walls, if the liners are provided with curved or bent liner regions which are coordinated with one another, are located opposite one another with respect to a central plane and are intended to exert a spring force toward the central plane, and the curved or bent liner regions have first run-on sections which are arranged in the region of the diameter of the hub and serve for guiding the empty hub, and furthermore second run-on sections are provided outside the region of the diameter of the first run-on sections, the said second run-on sections realigning with respect to the hub and guiding each of the tape windings to be wound.

This advantageously results in the curved or bent liner regions remaining outside the outer diameter of the tape roll and thus being able to act, in contact along a line, both on the annular and outer edges of the hubs and on the tape windings to be wound, for uniform formation of the tape roll.

In conjunction with the particular annular edge on the cassette housing, the guiding effect of the curved or bent liner regions in the immediate proximity of the hub for the tape and the tape roll is reinforced, so that tilting and tumbling of the hubs can be substantially ruled out in any operating state without other operating problems, for example due to a projecting tape clip, being more prominent as a result.

In particular, mechanical disturbances (impacts, blows) acting from outside on the cassette and also tape irregularities (nonuniform tape thickness over the tape width) are greatly reduced by the novel cassette embodiment, resulting in a more reliable cassette which functions more reliably in all operating situations.

To support the hub or the hubs without difficulty by means of the curved or bent liner regions, embossings or bends in the support liners can be provided in the longitudinal or crosswise direction of the cassette, although it is also possible to use annular embossings.

Regarding the shape of the curved, bent or embossed liner regions, triangular, trapezoidal, circular segments or other arc shapes can be used. In the height with respect to the hub, these liner regions are formed and arranged in such a way that line guidance of the annular edges of the particular hub and for the approaching tape is ensured. The curved or bent liner regions coordinated with one another are separated by a distance which essentially corresponds roughly to the tape width.

It is advantageous, when the cross-sectional shape of the embossings or bends is roughly symmetrical, if the distance from the midpoint of the hub to the symmetry line is greater than the radius of the hub. This ensures that the hub and the approaching tape windings are subjected to the same run-on, alignment and guidance conditions and it is not, for example, just the hub which is guided (as in German Patent 2,845,457).

In the case of support liners resting on the annular edges, the height of the said liners and the form and arrangement of the curved and bent liner regions are advantageously chosen so that, in the case of a full tape roll, the said liners do not rest against the inside of the cassette wall in the region of the hub diameter. This ensures that a spring action is constantly exerted on the hub and tape roll in the region of the outer diameter, both with regard to tilting and tumbling movements and with regard to any impacts and blows.

It is also advantageous if the axial play between the hub and the annular edges from [sic] housing is from about 0.3 to about 0.7, preferably about 0.5, times the axial play between the tape roll and the inner wall of the housing.

In an advantageous variant of the invention, liner regions which are curved or bent inside the diameter and are oriented toward the inner surface of the housing are provided in addition to the curved or bent liner regions which lie outside the diameter of the hub.

Consequently, as a result of the additional support inside the hub region, the spring forces acting on the outer edge can be increased.

The said additional inner curved or bent liner regions can, together with the outer liner regions, have a roughly sinusoidal shape or have the cross-section of two circular or curved shapes arranged side by side. In practice, the width of the annular edges should be substantially smaller than the total ring width of the hub, so that a certain angular region is retained for spring support of the hub and tape roll.

According to the invention, this takes sufficient account of all tolerances of the various, interacting cassette parts, which tolerances occur in the compact cassette as a mass product and sum in a disadvantageous manner in the extreme case.

The above embodiments and discussions also relate to the support liners themselves. Details are given in the claims relating to the support liners themselves and in the description.

BRIEF DESCRIPTION OF THE DRAWINGS

Details of the present invention are described with reference to embodiments shown in the drawings.

DESCRIPTION OF THE PREFERRED EMBODIMENTS

Figure 1:
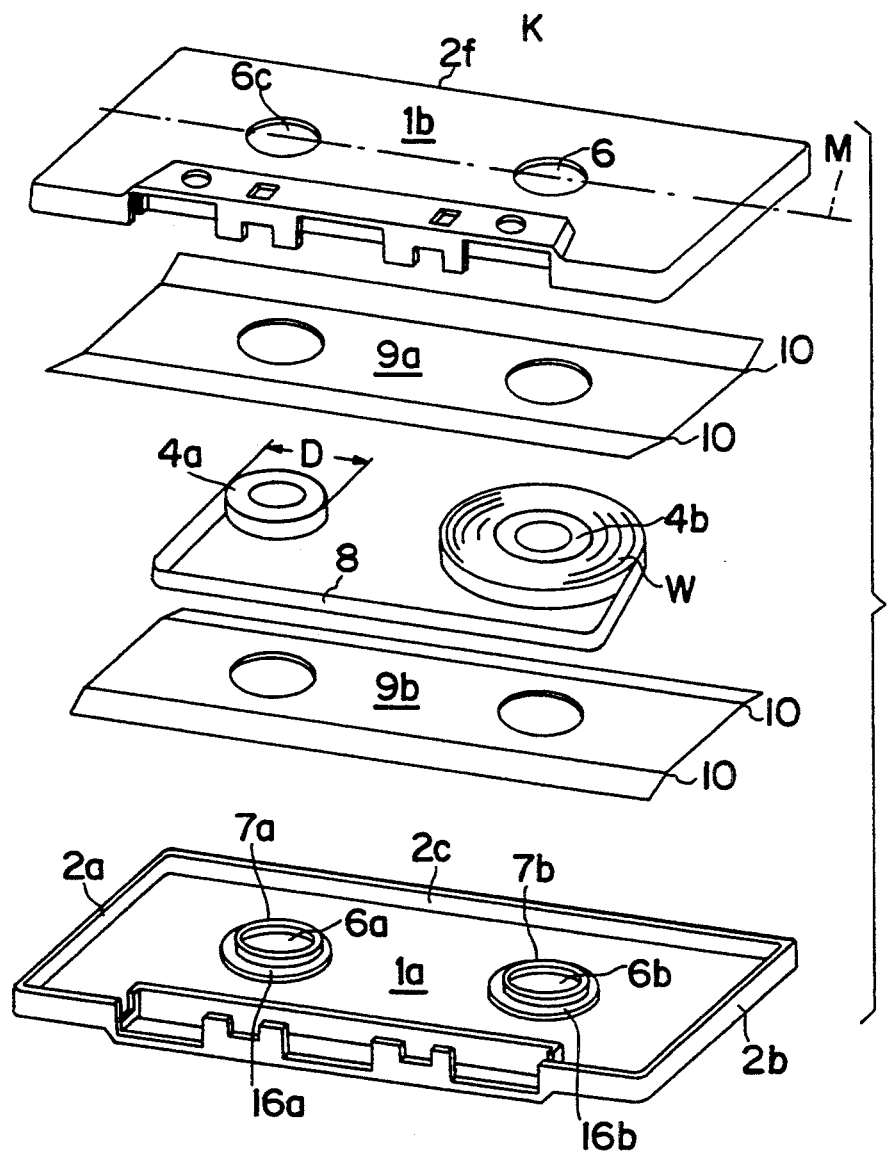
FIG. 1 shows an exploded view of a novel cassette

FIG. 1 shows a compact cassette K having a housing G, consisting of two rectangular bottom and lid walls 1a and 1b and side walls 2a, 2b and 2c or 2d, 2e and 2f, which, when assembled, form an essentially right parallelepiped cavity 3 for receiving the two hubs 4a and 4b, which are rotatably mounted around axes 5 at right angles to the main walls 1a, 1b and inward-pointing bearing edges 7a or 7c and 7b or 7d which surround orifices 6a or 6c and 6b or 6d coaxial with the said axes. A magnetic tape 8 can be wound between the hubs 4a and 4b, where the said tape is fastened at its ends to both hubs 4a and 4b and the tape roll W present on the hub 4b in the drawing can be completely or partly wound onto the hub 4a and the winding process can then take place in the reverse direction.

A support liner 9a or 9b is located on the inner side of each of the bottom and lid walls 1a and 1b in such a way that by [sic] longitudinal, narrow, parallel, curved or bent liner regions 10 exert a spring force against the end faces of the hubs 4a and 4b, against the tape roll W and against the magnetic tape 8 itself.

According to the invention, an additional annular edge 16 is provided around each bearing edge 7a to 7d of the housing G, of which annular edges 16a and 16b are shown in FIG. 1.

Figure 2:
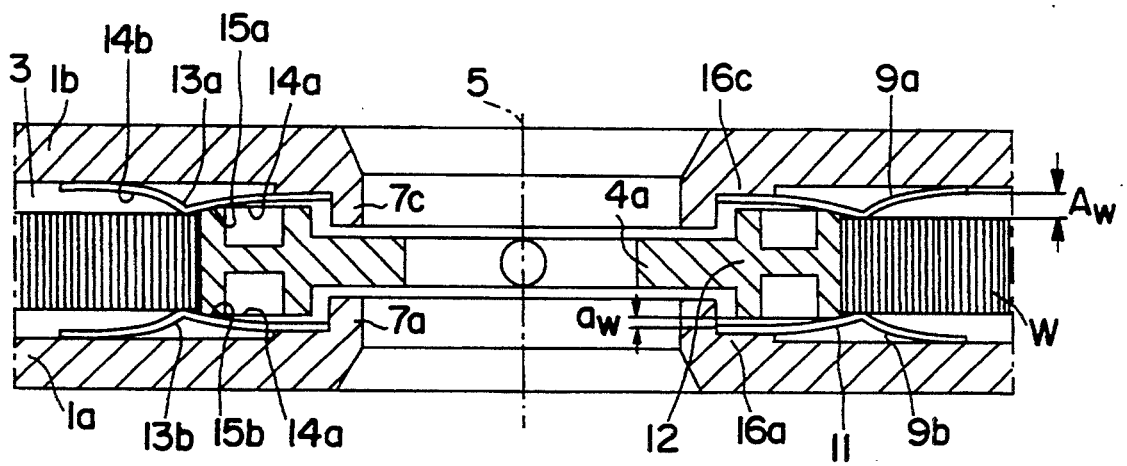
FIG. 2 shows a partial section of a cassette according to FIG. 1, having novel bent liner regions
Figure 3:
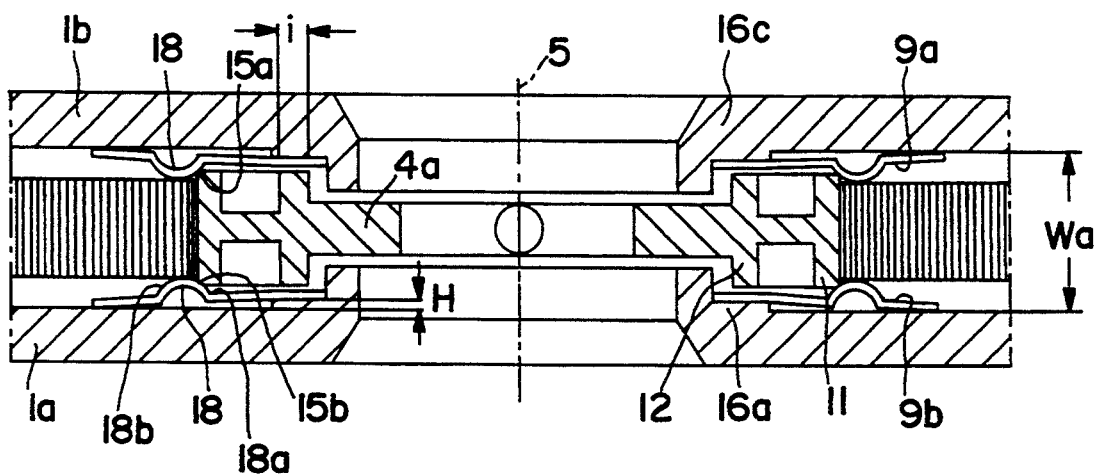
FIG. 3 shows a partial section of a cassette according to FIG. 1, having novel embossed circular liner regions

FIGS. 2 and 3 show sectional views of the hubs 4a and 4b, in which each hub 4 has an outer ring 11 and an inner ring 12 whose axial dimensions are essentially the same and are slightly broader (by 0.05 to 0.3 mm) than the magnetic tape 8.

The circular orifices of each of the support liners 9a and 9b extend roughly to the bearing edges 7a and 7b, so that, at the inner edge, they rest on the annular edge 16a or 16b of the housing G.

Here, the parallel, narrow liner regions 10 are in the form of parallel bends 13a and 13b, whose distance from the cassette central axis M is constant and is chosen so that the parallel bends 13 in contact with, and guiding, the tape 8 and/or the hubs 4a, 4b and/or the tape rolls W are just outside the outer diameter D of the outer ring 11 of the hub 4, so that the inward-pointing inclined guide surface 14a is in contact along a line with the outer upper or lower annular edges 15a and 15b of the empty hub 4, while the outward-pointing inclined guide surface 14b faces the approaching tape windings to be wound and is responsible for aligning them and guiding them to the hub.

Figure 4A:
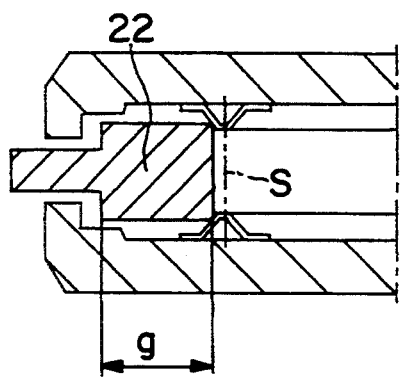
FIGS. 4a to 4g show various schematic support liner embodiments and cross-sectional examples of bent and embossed liner regions
Figure 4B:
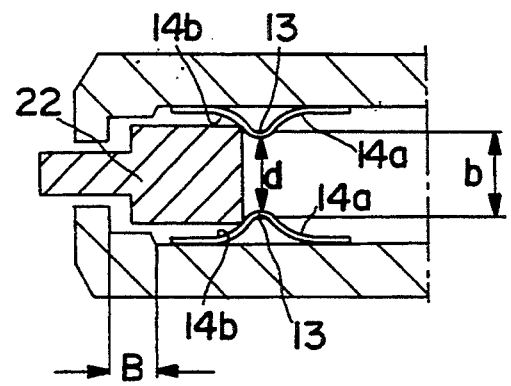

The smallest distance d between the bends 13 in the immediate proximity of the associated hub 22 (cf. FIG. 4b) essentially corresponds to the width b of the tape 8 or is slightly smaller (d≦b), as indicated by a dashed line in FIG. 4b.

Because in this case, in the region of the inner rings 12 of the hub 4a or 4b, the support liners 9a, 9b rest on the preferably annular edges 16 on the housing G which are arranged around the bearing edges 7, the guiding effect of the bends 13 and of the subsequent, other liner regions which are not shown in detail in the drawing and may also have a guiding effect is further reinforced. The advantageous result here is that, close to the periphery of the hub 4a, 4b, the guiding effect, in particular on the tape 8 and tape roll W, is increased, and at the same time tilting and tumbling of the hubs due to internal and external influences are likewise counteracted from the onset without the winding space for the tape roll W being inadmissibly reduced.

The inner surfaces of the bottom and lid walls 1a and 1b are denoted by 17a and 17b, respectively. The above-mentioned liner regions which also have a guiding effect and are adjacent to the ends, which are just visible, of the support liners 9a and 9b (FIGS. 2 and 3) are supported in some way on the said inner surfaces 17a and b of the housing wall in order to permit them to have an additional guiding effect on the tape roll W and the tape section running onto its periphery or running off from its periphery.

Figure 4C:
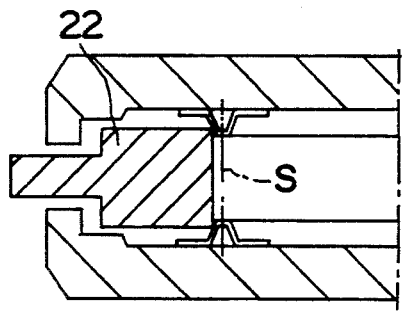
Figure 4D:
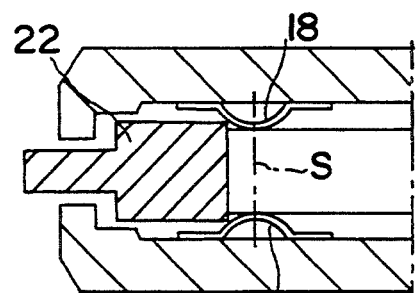
Figure 4E:
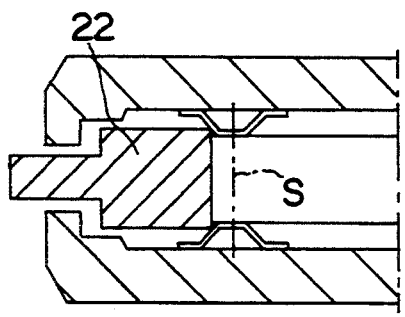
Figure 4F:
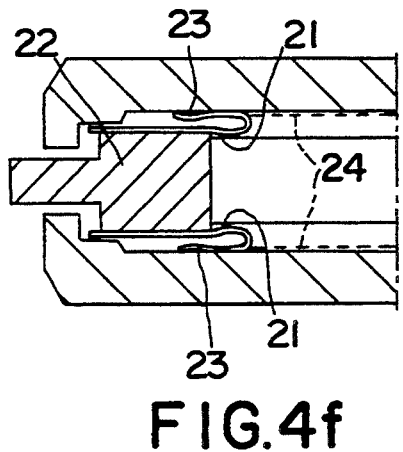

FIG. 3 shows a further embodiment of support liners 9a and 9b having parallel embossings 18 which have a circular segment cross-section and are provided with run-on, alignment and guidance sections 18a and 18b corresponding to the parallel bends 13. The circular cross-sectional form of the embossings 18 can readily be replaced by a curve shape having the same effect, for exampel a parabolic shape (cf. FIG. 4c) or a sinusoidal shape (cf. FIG. 4g), the functions and advantages being retained (cf. views in FIGS. 4a to 4g). Furthermore, the triangular cross-section of the parallel bends 13 (cf. FIGS. 4a and 4b) can be replaced by a trapezoidal cross-section (cf. FIG. 4e) or by a similar form having the same effect. FIG. 4f shows a run-on liner region 21 having a liner end 23 which is folded backward or into the diameter region D of the hub 22 and which is supported in this region on the inner surface 17. The dashed line indicates that in this case a further sprung support liner 24 may additionally be used on both sides of the tape roll.

All bends, embossings, folds, beads, etc. which can be used for the purposes of the present invention can be produced in a known manner by suitable cold or hot forming, depending on the liner material.

Figure 4G:
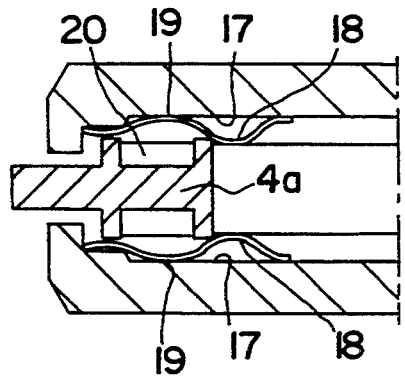

FIG. 4g shows support liners having embossings 18, which, however, additionally have circular or curved embossings 19 which are arranged in the diameter region D of the hub 4a, preferably in the region of the annular groove 20, and are supported on the inner surface 17.

The overall shape may be a sinusoidal shape or may be in the form of two offset circular segments. In both cases, the hub 4a is given greater stability and harder spring characteristic by the additional embossing 19, depending on the support liner material used.

For example, the dimensions of the individual parts, based on a compact cassette according to DIN 45,516 (June 1976), are given below:

| | |
|---|---|
| Width b of the magnetic tape 8 | b = 3.81 mm |
| Axial width of the hubs 4, 22 | h = 3.9–4.1 mm (⌀ 4.0 mm) |
| Axial height of the cassette cavity 3 | $W_a$ = 5.0–5.2 mm (⌀ 5.1 m [sic]) |
| Thickness of the support liner 9 | n = 0.050 mm |
| Axial height of the annular edge 1b | h = 0.2–0.4 mm (0.25–0.3 mm) |

The width B of the annular edge 1b in the embodiments shown is greater than the width of the inner ring part 12, ie. about 1.5–3 mm, but it must always be designed to be smaller than the ring width g (cf. FIG. 4a) of the hub 12 or 4.

Accordingly, the axial play of the hub 4 between the two support liners 9 plus the two annular edges 16 is from about 0.3 to about 0.7 times, preferably about half (factor of 0.5), the axial play of the hub between the inner surfaces 17 of the housing plus the two support liners.

It should be noted that the upper limit of 0.8 is determined by whether jamming of the hub 4 occurs or is just avoided.

Figure 5:
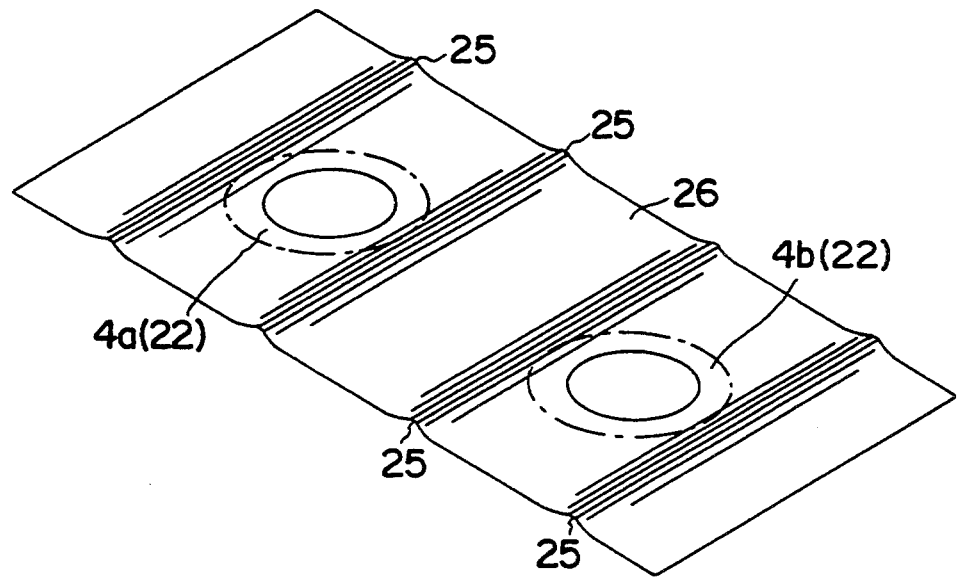
FIG. 5 shows a support liner having transverse bent or embossed liner edges

In FIG. 5, in a further support liner 26, the longitudinal parallel bends 10, 13 and 18 have each been replaced by two transverse bends 25 for each hub 4 or 22 indicated here.

Figure 6:
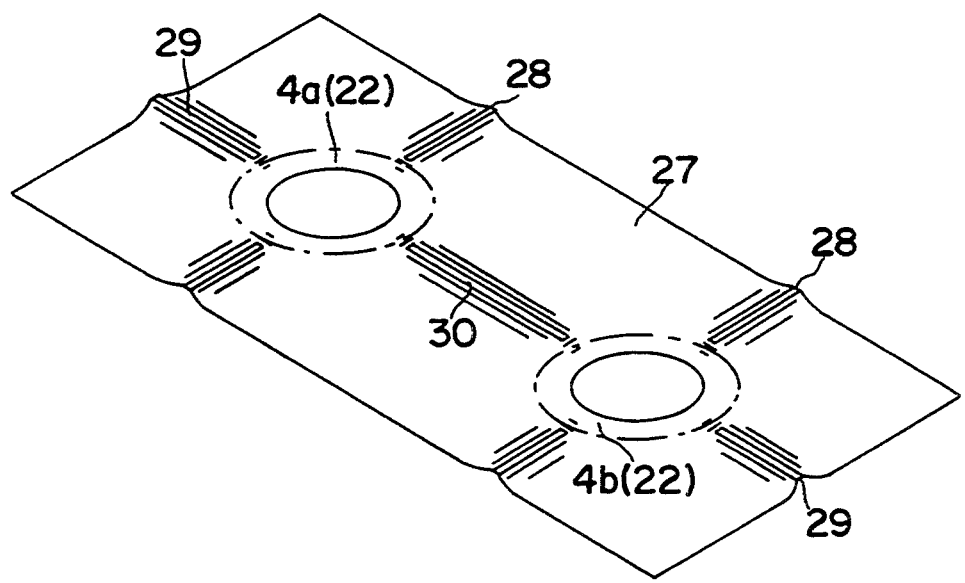
FIG. 6 shows a support liner having partial embossed liner edges ending at the hub periphery

FIG. 6 shows an embodiment of a support liner 27 having short or noncontinuous partial embossings 28 to 30, each of which begins at the liner edge but ends in the region of the outer diameter of the hubs 4a, 4b and 22. The run-on section for the hub is the particular end of the partial embossings 27 to 29.

Figure 8:
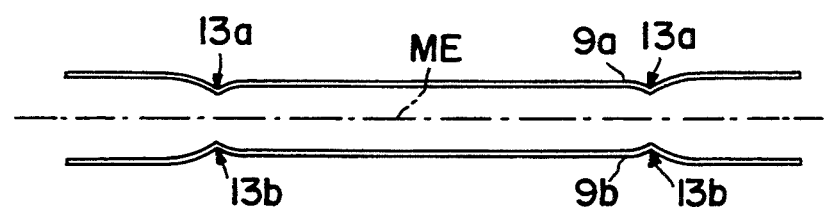
FIG. 8 shows the support liner embodiment from FIG. 2 as a pair, viewed as a cross-section through the middle.

FIG. 8 shows the cross-sectional view of a pair of support liners in the assembled position and the reference central plane ME which, in a tape cassette, is the central plane of the cassette cavity or of the central position of the tape roll.

The invention described is based on the observation in the various operating states, for example with the development of electrostatic charges in the cassette or at relatively high temperatures, for example during summer operation in a car, the hubs and the housing generally undergo less geometric changes (for example due to shrinkage or distortion) than is the case, for example, with a magnetic tape or tape roll due to stepless layers or loose regions (of tape windings), or due to distorted roll, hub displacement due to shrinkage and distortion or impaired guidance properties of the support liner. Hence, the axial play of the hubs in the housing can be readily reduced by the novel annular edges 16 if the tape roll still has sufficient space in the remaining cassette cavity 3 for such disturbances. The novel support liners which guide and support the tape roll in this cavity can, as already indicated above, have different shapes in these regions, as disclosed in many instances in the prior art.

Figure 7A:
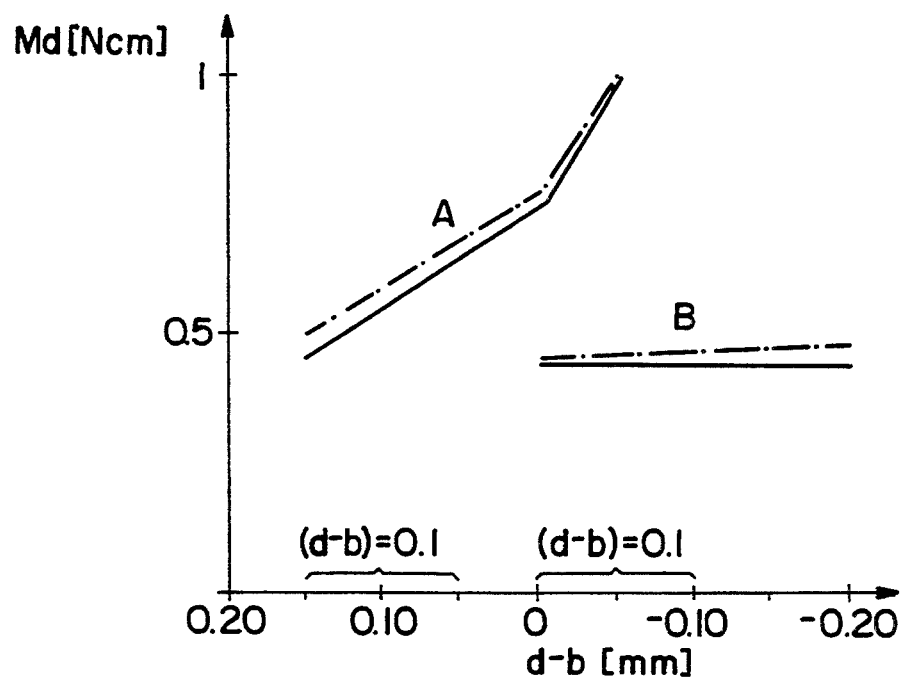
FIG. 7 shows torque and wow and flutter curves based on measurements, in comparison with a prior art cassette
Figure 7B:
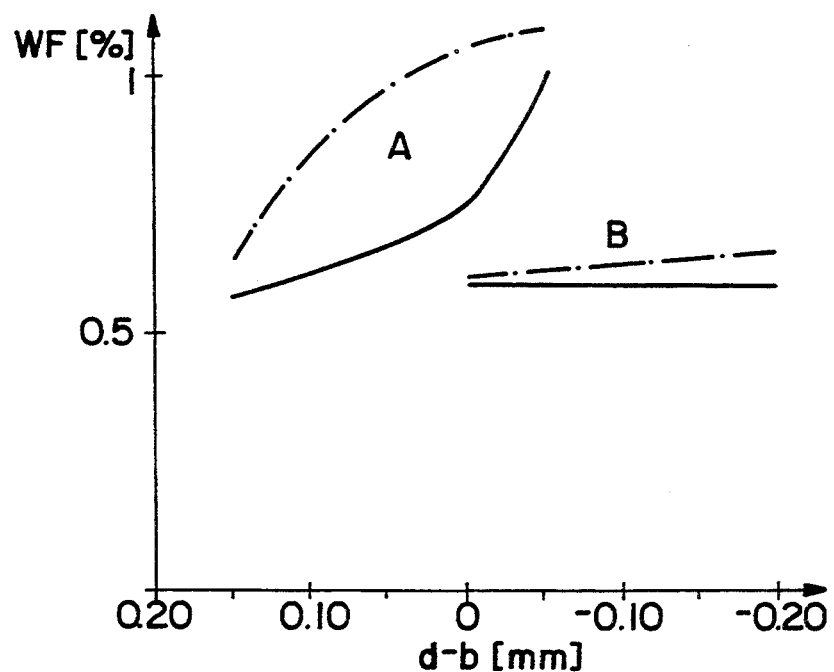

Because of the advantageous engagement of the novel bends and embossings with the annular edges 15a, b of the hubs 4, it is possible substantially to eliminate the serious disadvantage due to the tape clip in the prior art, where a problem arises with each rotation, so that even projecting tape clips no longer have an effect (cf. curves in FIG. 7).

To compare the invention with the prior art, a compact cassette (CC) from Sony, Japan, of Type UCX-S 90 is compared with a compact cassette of type Chrom-Maxima ® II from BASF AG, under otherwise identical measuring conditions. The CC from Sony corresponds to the cassette described in German Patent 2,825,457, the longitudinal embossings of the support liners having in practice an embossing height h=0.3 mm and a width (distance between the bend edges) of about 2.6 mm, so that the flat support liners were arranged relatively loosely between the inner surfaces of the housing and the tape roll, the embossings, however, having a hard spring characteristic. The embossing height range h of from 0.28 to 0.53 mm, stated in German Patent 2,825,457, is adjusted by underlaying with liner strips in the central region of the cassette, as in the BASF CC, in which the curved or bent liner regions pointing downward and upward had a total height of 0.8 mm, ie. supported the hub and tape roll under spring force. The support liner thicknesses were the same in both CCs.

In both cases of the torque measurement and of the wow and flutter measurement, the difference between the theoretical distance d (between embossings or bend edges (cf. FIG. 4b)) and the tape width b was plotted along the abscissa and was varied. The value 0 (zero) thus indicates that d=b, ie. there was no longer any play between the tape roll and the inner surface of the housing.

Description of the measurements

In the torque measurement, the winding torque during rewinding of a CC is measured without head contact with the tape. The winding spindle is braked with a constant torque of 0.08 Ncm. The winding side has an almost full roll and the unwinding side an almost empty one. The measurement is made shortly before the end of the tape passage. The CC is in the horizontal position during the measurement. The speed of the winding spindle is 500 rpm. The measuring apparatus is a torque meter (constructed by BASF AG, Ludwigshafen) and is based on the measurement of the increase in power consumed by the winding motor.

The wow and flutter measurement is a measurement of the fluctuation in the audio output level of a CC during playback of a recorded signal of frequency 3150 Hz on two different commercial single-capstan recorders, each having two heads. The wow and flutter meter from Woelke, 8069 Schweitenkirchen measures the resulting frequency fluctuations unweighted with a demodulator bandwidth of 1000 Hz. From a large number of measurements, the ten largest differences are used and the mean value is calculated using an HP 85 B calculator (from Hewlett Packard). All measured values are represented in a frequency distribution and recorded over the entire tape length.

The curves A are the measured curves for the CC UCX-S 90 (Sony) and the curves B are those for the BASF CC according to the invention.

The solid curves indicate the measured values of the CC unchanged with regard to the tape clip, whereas the dashed curves show the measured values where the tape clip is displaced by 0.1 mm with respect to the plane of the hub.

| Δ (d−b) [mm] | 0.1 | | 0.15 | | 0.20 | | |
|---|---|---|---|---|---|---|---|
| Md [Ncm] | 0.20 | (44%) | 0.29 | (64%) | 0.45 | (100%) | ncd |
|  | 0.20 | (40%) | 0.28 | (56%) | 0.4 | (80%) | wcd |
| W + F [%] | 0.085 | (11.4%) | 0.175 | (30.4%) | 0.425 | (73.9%) | ncd |
|  | 0.33 | (51.5%) | 0.40 | (62.5%) | 0.44 | (68.8%) | wcd | ncd = no clip displacement
wcd = with clip displacement (In the following Table too, the percentages are based in each case on the initial value:
For A, on the particular value at d−b=0.15
For B, on the particular value at d−b=0)

The result obtained is that the increase in torque rises from 44% to 100% even without clip displacement. The increase in the wow and flutter interference is from about 11% to about 74% without clip displacement and from 51.5 to about 69% with clip displacement.

From the mechanical point of view alone, the prior art CC is not suitable for trouble free operation on all commercial recorders and causes the electro-acoustic playback to deteriorate by a half to two thirds if the tape clip projects by only 0.1 mm, which frequently occurs in production.

Measurements for CC B (BASF)

| Δ (d−b) [mm] | 0.1 | | 0.15 | | 0.20 | | |
|---|---|---|---|---|---|---|---|
| Md [Ncm] | 0 |  | 0 |  | 0.01 |  | ncd |
|  | 0.03 | (6.7%) | 0.035 | (7.7%) | 0.04 | (8.9%) | wcd |
| W + F [%] | 0 |  | 0 |  | 0 |  | ncd |
|  | 0.025 | (4.2%) | 0.0375 | (6.25%) | 0.44 | (6.7%) | wcd | ncd = no clip displacement
wcd = with clip displacement

It is found that, in spite of a considerable reduction in the spring travel distances of the support liners, there is only a slight increase of less than 9% in the torque, even with displacement of the tape clip. This tolerance is readily coped with by most recorders, so that there are no mechanical disturbances during operation of the CC on the recorders.

Even with displacements of the tape clip, wow and flutter are substantially below 7%, which, in view of the more difficult conditions (reduction of the spring travel plus displacement of the tape clip) confirms the considerable reliability of these novel support liner embodiments.

A tape cassette is provided with a pair of support liners having curved or bent liner regions, which essentially act on the outer periphery of the one or more hubs and on the first approaching tape windings. In the region of the inner diameter, each liner can therefore be flat since the greater lever action at the outer periphery permits centering and stabilization of the rotation. Constriction of the housing bearing at the inner diameter makes the centering and frictional properties there independent of a change in the curve or bend shape of a liner. Hence, support liners and tape cassettes are suitable for all kinds of cassettes containing support liners and magnetic tape.

We claim:

1. A magnetic tape cassette of the Philips type which comprises: a cassette housing having a bottom wall and an upper wall;

at least one essentially flangeless hub rotatably mounted on an annular bearing edge on said cassette housing, said hub having upper and lower annular edges above and below its winding surface onto which and/or from which a tape can be wound or unwound in said cassette housing;

two support liners, each having curved or bent liner regions, said curved or bent regions of said two support liners being coordinated with each other and located opposite to one another with respect to the horizontally central plane of the cassette, said liners positioned to come in contact with at least one hub, with at least one tape roll and with the tape which is temporarily or permanently provided between the tape roll having tape windings and the bottom and upper walls of the cassette housing, the liner regions serving to guide the tape and for mounting the tape roll;

an axial bearing constriction provided essentially between the hub and the cassette housing, said constriction being formed on the cassette housing as an additional annular edge and being located in the region of the diameter of the hub;

said support liners extending beyond the axial bearing constriction whereby the rotatability of the hub is increased, and said curved or bent liner regions having run-on flanks and run-on sections, whereby the run-on flanks face at least parts of the upper and lower annular edges of the hub, thus exerting pressure toward the center of the hub in the radial direction as well as in the axial direction, thereby centering and guiding the hub when it is empty, and whereby the run-on sections align with and guide each winding on the hub.

2. A cassette as defined in claim 1, wherein the curved or bent liner regions are embossings or bends in the longitudinal direction of the cassette.

3. A cassette as defined in claim 1, wherein the curved or bent liner regions are embossings or bends in the transverse direction of the cassette.

4. A cassette as defined in claim 1, wherein the curved or bent liner regions are, in plan view, annular embossings above and below the tape rolls.

5. A cassette as defined in claim 1, wherein the run-on flanks are constructed as run-on bevels.

6. A cassette as defined in claim, 1, wherein the cross-sectional shape of the embossings or bends is a shape from the group comprising a triangle, trapezoid, circular segment or arc.

7. A cassette as defined in claim 6, wherein the cross-sectional shape of the embossings or bends is roughly symmetrical and the distance from the midpoint of the hub to the symmetry line is greater than the radius of the hub.

8. A cassette as defined in claim 1, wherein the curved or bent support liner regions coordinated with one another and located opposite one another are separated by a distance which corresponds roughly to a tape width.

9. A cassette as defined in claim 1, wherein the support liners resting on the annular edges, the height and width of the annular edges and the form and arrangement of the curved or bent liner regions are chosen so that, with a full tape roll, the support liner does not rest against the inside of the cassette wall in the region of the hub diameter.

10. A cassette as defined in claim 9, wherein the axial play between the hub and the annular edges on the housing is about 0.3–0.7 times the axial play between the tape roll [sic] and the inner surfaces of the housing.

11. A cassette as defined in claim 9, wherein the axial play between the hub and the annular edges on the housing is about 0.5 times the axial play between the tape roll [sic] and the inner surfaces of the housing.

12. A cassette as defined in claim 1, wherein liner regions which are curved or bent and arranged inside the diameter of the hub and are oriented toward the inner surface of the housing are provided in addition to the curved or bent liner regions which lie outside the diameter of the hub.

13. A cassette as defined in claim 12, wherein the cross-sectional shapes of both liner regions, within and outside the diameter of the hub, together is [sic] roughly a sinusoidal shape.

14. A cassette as defined in claim 12, wherein the cross-sectional shapes of both liner regions, within and outside the diameter of the hub, together are roughly two circular segment shapes adjacent to one another.

15. A cassette as defined in claim 1, wherein the width of the annular edges is substantially smaller than the ring width of the hub.

* * * * *